March 5, 1957  F. J. BAYES  2,783,574
FISHING APPLIANCE
Filed April 5, 1954  2 Sheets-Sheet 1

INVENTOR.
FRANKLIN J. BAYES
BY
ATTORNEYS

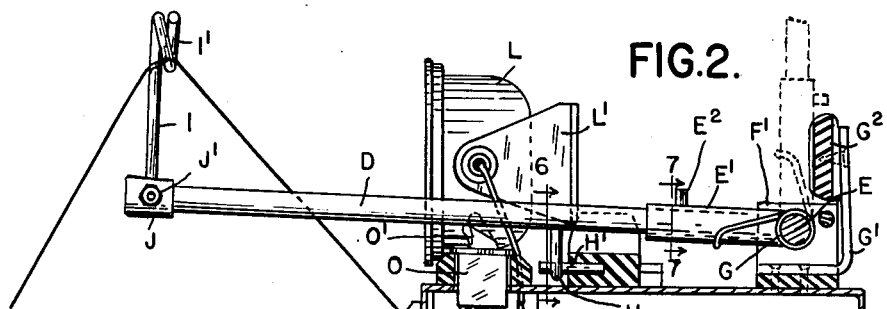
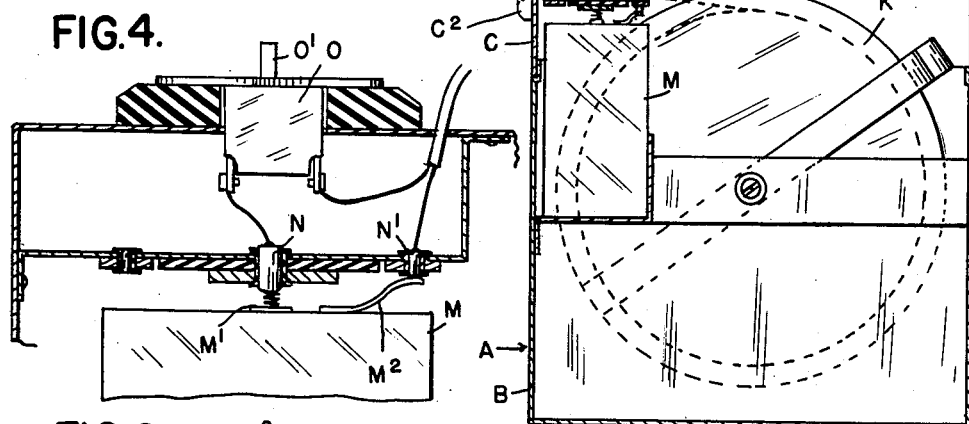
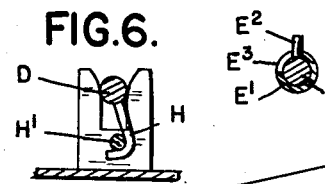
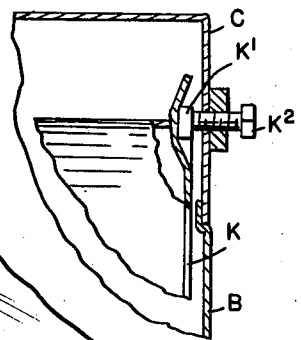
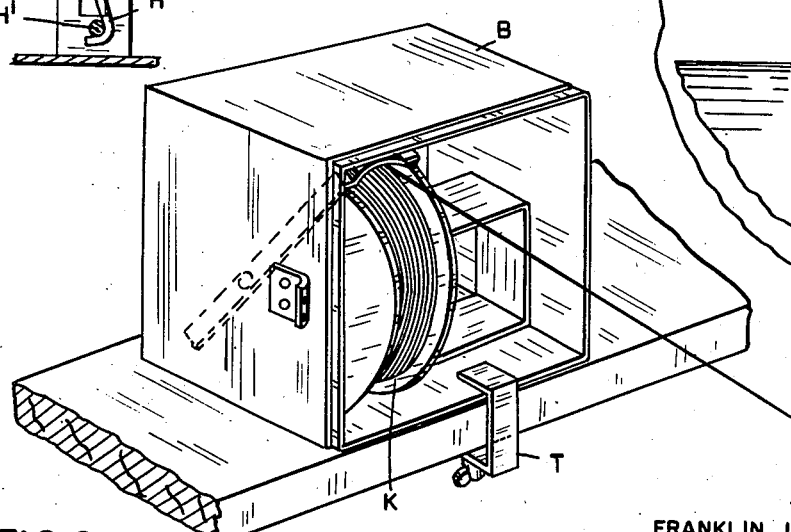

United States Patent Office 2,783,574
Patented Mar. 5, 1957

2,783,574

FISHING APPLIANCE

Franklin J. Bayes, Detroit, Mich., assignor of one-half to George Y. Paget, Grosse Pointe Woods, Mich.

Application April 5, 1954, Serial No. 420,870

8 Claims. (Cl. 43—16)

The invention relates to fishing appliances more particularly designed for use in still fishing, but portions of which may also be useful in trolling.

It is one of the objects of the invention to obtain a construction for holding the line leading to the baited fish hook selectively positioned, which holding means whenever there is a strike will automatically pull the line to set the hook and will simultaneously display a signal. A further feature is the provision of means for automatically taking up the slack in the line as the fish is drawn in by hand.

With these objects in view the invention consists in an assembly including a casing provided with anchoring means and having mounted thereon the automatic hook setting means and an electric lamp normally turned off but automatically illuminated whenever there is a strike. Within the casing are the necessary accessories protected from the weather and the whole device constitutes a small package which can be easily transported to the position where it is to be used.

In the accompanying drawings:

Fig. 2 is a vertical sectional view taken on line 2—2 of Fig. 3;

Fig. 4 is an enlarged sectional view of a portion of Fig. 2;

Fig. 5 is a sectional view taken on line 5—5 of Fig. 3;

Figs. 6 and 7 are sectional views taken on lines 6—6 and 7—7 respectively of Fig. 2;

Fig. 8 is a perspective view of the device as used in trolling.

Figure 1:
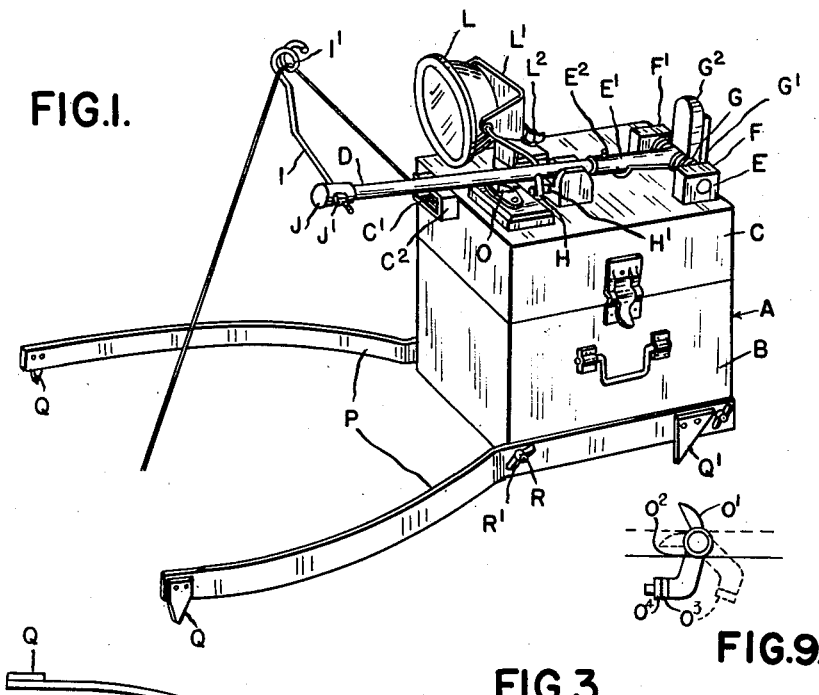
Fig. 1 is a perspective view of the device as used for ice fishing.
Figures 3, 9:
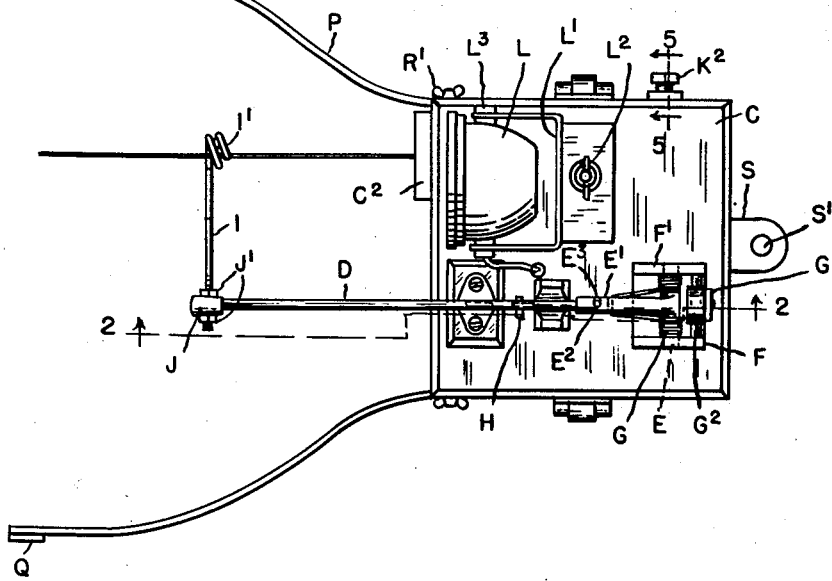
Fig. 3 is a plan view of the device.

Fig. 9 illustrates diagrammatically the circuit controlling switch.

As illustrated A is the casing shown as of rectangular form and substantially equal in its three dimensions. This casing includes a body portion B open at the top, and a cap C for closing the same. Pivotally mounted on this cap is a rock arm D, which in normal position is substantially horizontal and extends outward beyond the casing. The mounting comprises a transversely extending pivot member E engaging bearings F and F' at its outer end and having a tubular socket member E' associated therewith for receiving the end portion of the arm. A coil spring G is sleeved upon the pivot member E and is tensioned to bias the arm to swing upward from its horizontal position towards a vertical position. However, the arm is normally held down by a detent including a hook member H depending from the arm and engaging a keeper H' mounted on the cover. The hook H is engaged with or disengaged from its keeper by a partial rotation of the arm D in its socket H', such movement being limited by a pin $E^2$ extending radially from said arm through a segmental slot $E^3$ in the socket. A trip arm I is secured to the outer end of the arm D and extending transversely therefrom. The outer end of this arm has an eye portion I' and the arm is adjustable in length, preferably by a threaded engagement between the same and a threaded socket in the arm D, as indicated at J. Lock nuts J' serve to hold said arm in its adjusted position rigid with the arm D. Within the casing A is an automatic reel K for taking up the slack in the line, the specific construction of which is not a part of the instant invention. The reel may be of a diameter but slightly less than the dimensions of the casing and it is located at one side of said casing. In the side of the cap adjacent to the reel is a slot C' surrounded by a frame $C^2$. This forms an outlet for the line from the reel. The location of this slot and frame is substantially opposite the eye I' so that the line may be passed from the reel through said eye. For convenience the eye may be in the form of a spiral providing a slot for the entrance of the line and with overlapping portions on opposite sides of said slot. Thus, a downward pull on the line will depress the trip arm I thereby rotating the arm D to disengage the hook H from the detent H', and permitting said arm to be swung upward by the spring G. A stop formed by an angle member G' and cushion $G^2$ arrests movement of the arm D.

Also, mounted on the top of the cover C is an electric lamp L. This preferably has a bracket member L' swivelled on the cap and secured in adjusted position by a clamping wing nut $L^2$. The bracket is bifurcated to embrace the lamp and engages trunnions $L^3$ thereon. Thus, the lamp may be adjusted to send its beam in any direction. A battery M for supplying current to the lamp is also located within the casing. At the top of this battery are contacts M' and $M^2$ which engage cooperating insulated contacts N and N'. The latter contacts are connected into an electric circuit including the lamp L and a switch O. This switch is mounted on the top of the cover C and is positioned so that the operating member O' will be depressed by the arm D when the latter is in its normal horizontal position. The member O' is biased as by a spring $O^2$ to automatically rise and in so doing to close the electric circuit as indicated diagrammatically in Fig. 9 by contacts $O^3$ and $O^4$ but in its depressed position the circuit will be open.

As above described the device is designed for use primarily in still fishing including ice fishing and fishing from the bank of a body of water. For each of these uses it is necessary to anchor the casing so as to resist any movement thereof by the pull of the line. Also, to afford stable support for the casing I have provided a pair of bars P which are detachably secured to opposite sides of the casing adjacent to the bottom thereof by screw threaded studs R and wing nuts R'. These bars project beyond the casing in the same direction as the arm D and are outwardly flared. The bars are also provided with downwardly projecting sharpened spikes which in the case of ice fishing are driven into the ice. These spikes include a pair Q at the outer ends of the flared arms and a second pair Q' near the opposite end of the bar and in the portion thereof attached to the casing. The latter have a vertically extending forward edge which when driven into the ice will lock the casing against forward movement by the pull of the line, thus affording anchorage. When the device is used on the bank other anchoring means is provided. This, as shown in Fig. 3, is a lug or plate S at the bottom of the casing projecting rearward therefrom and having an aperture S' therein through which a stake or other anchoring means may be driven into the bank.

Ice fishing

The device may be positioned in relation to the hole through the ice (not shown) and secured by forcing the spikes into the ice. The line from the reel K passes outward through the slot C' and then upward into engagement with the eye I', thence downward through the hole in the ice. The friction of the hook H pressed upward against the keeper H' by the tension of the coil spring G is sufficient to hold the trip arm I from movement by any normal stresses in the line. However, this trip arm may be adjusted in length by screwing it inward or outward of the threaded socket in the arm D and thus the resistance to pull of the line may be altered to suit conditions. When properly set the device will remain inactive with the light turned off until a strike occurs, whereupon the pull on the line will depress the trip arm I, rocking the hook H out of engagement with the keeper H' and permitting the coil spring G to swing the arm D upward. This sudden jerk on the line will set the hook and as the switch O is simultaneously operated the lamp will be illuminated. The lamp has been previously adjusted to properly direct its beam so that in addition to the signal effect it will facilitate the pulling in of the line and landing of the fish. The reel K which is normally held from movement by a brake K' is released by the turning of a screw K² and will automatically reel in the slack in the line to avoid entanglement.

For fishing from the bank the action will be the same but instead of using the spikes Q and Q' for anchoring means a stake is driven through the aperture S' of the plate S.

The casing A without the cover C or the anchor bars P may be used in trolling to automatically take up slack in the line. For this purpose the casing may be laid on its side over a boat seat or in some other convenient location and secured by a screw clamp T.

The casing A also forms a container for other fishing accessories, among which may be included a small combustion heater (not shown) which will be especially useful when the device is used for ice fishing.

What I claim as my invention is:

1. A fishing appliance comprising a container casing provided with anchoring means therefor, an automatically rewinding reel within said casing, an arm pivotally mounted at one end thereof upon said casing to swing from a substantially horizontal to a vertical position, a resilient means for biasing said arm to so swing, a detent for restraining such movement, a trip arm mounted on the other end of said arm, a bearing on the outer portion of said trip arm over which is passed a line from said reel leading to a fish hook, said trip arm being responsive to tension on the line occasioned by a strike for releasing said detent whereupon the swinging of said arm and pull on the line will set the hook, and means for variably resisting such release to predetermine the line tension required therefor.

2. The construction as in claim 1 having a battery in said container, an electric lamp mounted on said container having circuit connection with said battery, a switch controlling said circuit held open by said arm in its depressed position and adapted to automatically close on release by said arm.

3. The construction as in claim 2 wherein the device is provided with anchor bars detachably secured to opposite sides of said container at the base thereof and extending outward beyond the same, said bars having depending sharpened spikes which may be driven into the ice when the appliance is used for ice fishing.

4. The construction as in claim 2 in which said container is provided with an apertured lateral projection from its base adapted for engagement with an anchoring stake when the device is used for fishing from a bank.

5. A fishing appliance comprising a reel having a line wound thereon, a fish hook connected to said line, a container enclosing said reel having an opening through which the line therefrom passes outward with the fish hook at its end, an arm having a portion thereof pivotally mounted on said container and having a second portion free for limited angular rotation about its axis with respect to the portion pivotally mounted, means biasing said arm to swing upward, a detent for restraining such upward movement engageable with said arm by rotation thereof, and a trip arm extending laterally from the outer end of the aforesaid arm and having a bearing over which is passed the line leading from said reel to the fish hook, the resistance to rotation of said arm being sufficient to hold said trip arm and bearing in position under normal tension on said line but yieldable under the increased tension of a strike to release said detent and permit automatic swinging of said arm to set the hook.

6. The construction as in claim 5 in which said bearing on said trip arm is adjustable towards or from the axis of rotation of said arm to vary the resistance with respect to the normal tension on said line.

7. The construction as in claim 6 in which the outer end of said trip arm has an eye forming the bearing engageable with said line.

8. The construction as in claim 7 in which said trip arm has a threaded engagement with a threaded bearing in the arm to which it is attached forming the means for varying the distance of said eye from the axis of rotation of said arm.

References Cited in the file of this patent

UNITED STATES PATENTS

| 2,194,088 | Joabson | Mar. 19, 1940 |
| 2,618,090 | Kimura | Nov. 18, 1952 |
| 2,618,091 | Sheraski | Nov. 18, 1952 |
| 2,709,867 | Routh | June 7, 1955 |

FOREIGN PATENTS

| 92,089 | Sweden | Apr. 21, 1938 |